United States Patent [19]
Ishii et al.

[11] Patent Number: 5,321,536
[45] Date of Patent: Jun. 14, 1994

[54] LIQUID CRYSTAL OPERATION DEVICE AND AN IMAGE SYSTEM USING THE SAME

[75] Inventors: Yutaka Ishii, Nara; Yoshitaka Yamamoto, Yamatokoriyama, both of Japan

[73] Assignee: Sharp Kabushiki Kaisha, Osaka, Japan

[21] Appl. No.: 969,104

[22] Filed: Oct. 30, 1992

[30] Foreign Application Priority Data

Oct. 31, 1991 [JP] Japan .................................. 3-286740

[51] Int. Cl.$^5$ ............................................. G02F 1/133
[52] U.S. Cl. ........................................ 359/72; 359/58; 359/59
[58] Field of Search ..................... 359/53, 58, 60, 72, 359/59

[56] References Cited

U.S. PATENT DOCUMENTS

| | | | |
|---|---|---|---|
| 4,114,991 | 9/1978 | Bleha, Jr. et al. | 359/72 |
| 5,042,917 | 8/1991 | Fujita et al. | 359/72 |
| 5,046,828 | 9/1991 | Takanashi et al. | 359/72 |

OTHER PUBLICATIONS

K. Hirabayashi, et al., "Spatial Light Modulators With Super Twisted Nematic Liquid Crystals", *Optics Letter*, vol. 16, No. 10, May 15, 1991, pp. 764–766.

K. Sayyah, et al., "High Performance Single Crystal Silicon Liquid Crystal Light Valve With Good Image Uniformity", *Applied Optics*, vol. 28, No. 22, Nov. 15, 1989, pp. 4748–4756.

H. Hamano, et al., The Transaction of the Institute of Electronics, Information and Communication Engineers of Japan, C–II, vol. 173–C–II, No. 11, pp. 703–712, Nov. 1990, "Liquid Crystal Display with Image Processing Function".

Japanese Laid–Open Patent Publication No. 53–1494, Laid on Jan. 9, 1978, A. Yasutake et al.

Japanese Laid–Open Patent Publication No. 53–73996, Laid on Jun. 30, 1978, S. Handa et al.

Japanese Patent Application No. 3–324142, filed on Dec. 9, 1991, A. Hatano et al.

*Primary Examiner*—William L. Sikes
*Assistant Examiner*—Huy Mai
*Attorney, Agent, or Firm*—David G. Conlin; Robert F. O'Connell

[57] ABSTRACT

A liquid crystal operation device including a pair of substrates opposed to each other; a liquid crystal layer interposed between the substrates; and a plurality of first electrodes and a plurality of second electrodes which are at least partially opposed to each other with an insulating film interposed therebetween. The first electrodes are provided on one of the substrates. The liquid crystal operation device further includes a third electrode provided on a surface of the other substrate to be opposed to the second electrodes; and a photosensitive section bridging the second electrodes and a signal line provided in the vicinity of the second electrodes. The photosensitive section is formed of a photoconductive material. A first capacitance is generated between the first electrodes and the second electrodes, a second capacitance is generated between the second electrodes and the third electrode. The second electrodes are controllably connected to and separated from the signal line by the photosensitive section. An image processing system includes such a liquid crystal operation device; and a spatial light modulator for optically transferring an image to the liquid crystal operation device.

10 Claims, 8 Drawing Sheets

LIQUID CRYSTAL OPERATION DEVICE AND AN IMAGE SYSTEM USING THE SAME

BACKGROUND OF THE INVENTION

1. Field of the Invention

The present invention relates to a liquid crystal operation device and an image processing system using the same for wide use in industrial products capable of image processing and diagram processing and products for factory automation.

2. Description of the Related Art

Introduction of computer technologies in recent years brought about remarkable developments in image processing technologies in the fields of medical equipment, remote sensing, robotic vision, and the like. Today, digital image processing technologies are rapidly improved in combination with the advanced LSI technologies for wide use in consumer products including audiovisual appliances and office automation equipment.

The digital image processing technologies realize the following through operations using pixels (addition, subtraction, etc.), data conversion, histogram preparation, marginal distribution preparation, logic operation (contraction, expansion, outline extraction, etc.), and labeling.

(1) Visualization of X-ray images, temperature distribution images, etc., (2) Clarification of images by noise removal and brightness compensation, (3) Extraction and measurement of features of images, and (4) Image recognition and image understanding.

Figure 10:
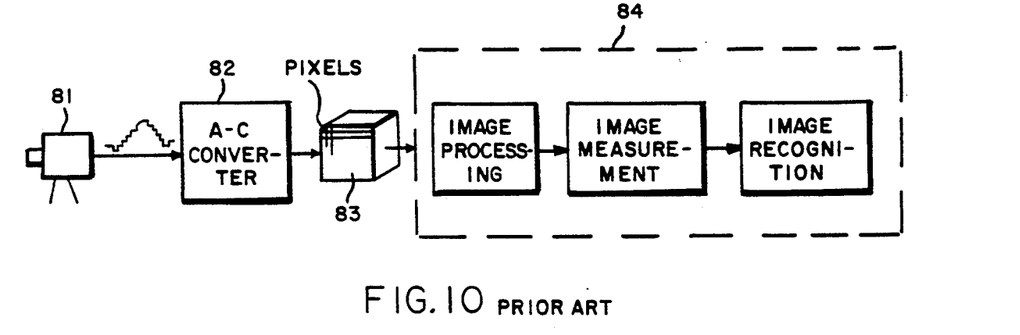
FIG. 10 is a schematic view of a conventional image processing system.

FIG. 10 illustrates general image processing steps for image recognition. An image data (analog signal) obtained by a TV camera 81 is converted into a digital signal by an A-D converter 82, and the digital signal is stored in an image memory 83. Based on the stored signal, an external operation device 84 performs image processing and image measurement, thereby performing image recognition. The image data processed in such a system has the following features.

(1) Two-dimensional, (2) Large in amount; for example, approximately 256KB to 1MB per a plane, and (3) Gradation (number of bits) per an image is diversified.

In order to perform high speed digital processing of an image data having such features, the data stored in the image memory 83 should be processed at a high speed. For improving the processing speed in the image memory 83, various systems including the following representative ones have been proposed.

(1) Complete parallel processing system. Basic operation modules each corresponding to a pixel holding a two-dimensional image data are two-dimensionally provided, and the modules are simultaneously operated in parallel. In this system, real-time image processing is realized.

(2) Local parallel processing system. Access to data and operation are performed in parallel in a local area having 3×3 to 15×15 pixels. Such local processing is sequentially performed for all the pixels.

(3) Pipeline processing system. Image data are sequentially sent to processing modules connected to one another as a pipe line, and the processing results are sequentially obtained after a certain delay time.

However, none of these systems have sufficient processing capability at present. These systems have inconveniences such that it takes a long time to process a huge amount of image data and also to transfer data between an external memory device and a main memory device (image memory). The complete parallel processing system has other inconveniences because of an enlarged circuit scale and a higher manufacturing cost thereof.

Under the circumstances, an image processing system which processes a huge amount of image data at a high speed and simultaneously recognizes the image has been demanded.

To answer this demand, application of a liquid crystal device to image processing has been proposed (The Transactions of the Institute of Electronics, Information and Communication Engineers of Japan, C-II, Vol.-J73-C-II, No. 11, pp. 703 to 712, 1990).

Figure 11:
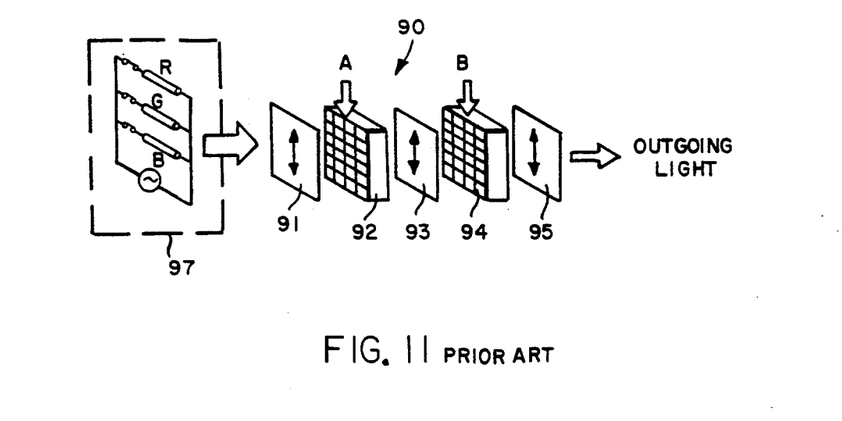
FIG. 11 is a schematic view of another conventional image processing system.

FIG. 11 illustrates an image operation system 90 which is proposed in the above-mentioned literature. The image operation system 90 includes a light source 97 emitting red, blue and green light beams. The light beams are transmitted sequentially through a color polarizing plate 91, a liquid crystal display device (referred to as the LCD device, hereinafter) 92, a color polarizing plate 93, an LCD device 94, and a color polarizing plate 95. The LCD devices 92 and 94 are, for example, of an active matrix type and perform black and white display. The light outgoing from the color polarizing plate 95 indicates the operation result. The color polarizing plates 91, 93 and 95 linearly polarize a light beam having a specified wavelength, but transmits a light beam having any other wavelength without such polarization.

Figure 12A:
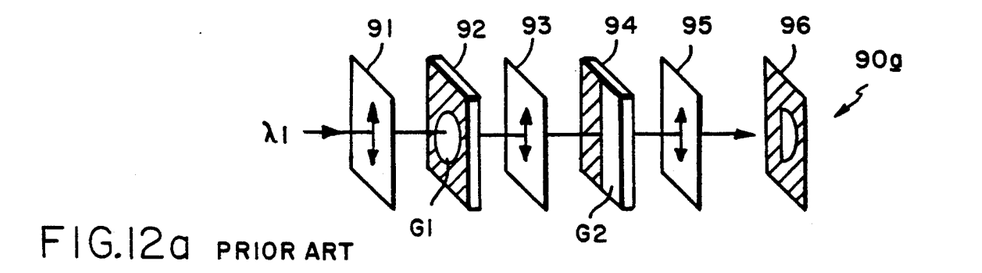
FIGS. 12a through 12c are views illustrating operations performed by the conventional image processing system of FIG. 11.
Figure 12B:
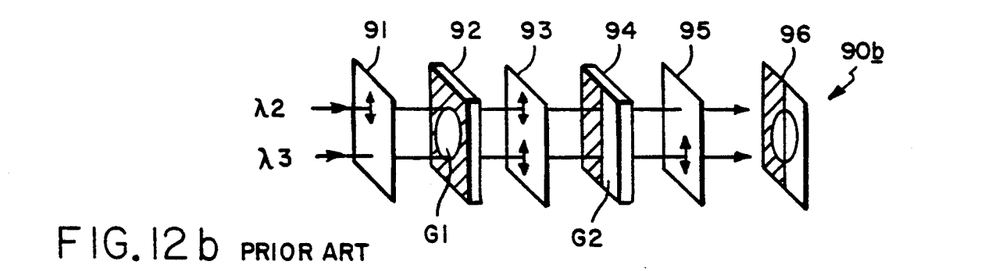
Figure 12C:
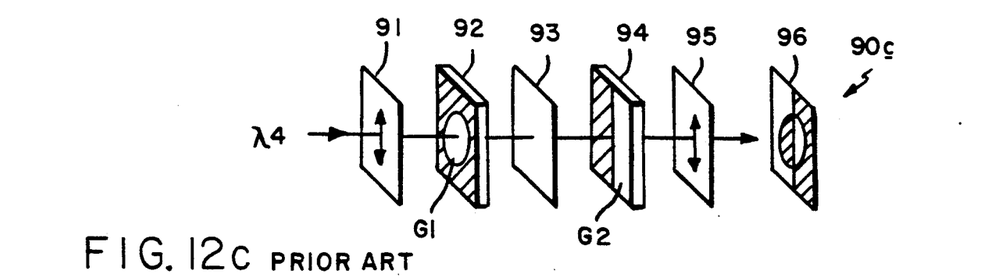

FIGS. 12a through 12c illustrate a performance of the image operation system 90. In these figures, the hatched areas are rotation regions which transmit light while rotating the light, and blank areas are transmission regions which transmit light without rotation. FIG. 12a concerns an image operation system 90a for obtaining an AND (G1·G2) of images G1 and G2 displayed in the LCD devices 92 and 94. In this operation, the color polarizing plates 91, 93 and 95 linearly polarize all the light beams having a wavelength of $\lambda_1$ in an identical direction. In this construction, light beams which are linearly polarized by the color polarizing plate 91 are rotated at a specified angle by a rotation region of the LCD device 92 but are transmitted as linearly polarized light beams through a transmission region of the LCD device 92. The light beams transmitted through the transmission region are transmitted through the color polarizing plate 93 as they are, and then are rotated by a rotation region of the LCD device 94 but are transmitted through a transmission region of the LCD device 94 as they are. The light beams rotated by the LCD device 94 are shielded by the color polarizing plate 95, but the light beams transmitted through the LCD device 94 without rotation are transmitted through the color polarizing plate 95. The light beams rotated by the LCD device 92 are shielded by the color polarizing plate 93. As a result, a semicircular image is displayed as an AND operation result on a display plane 96.

FIG. 12b concerns an image operation system 90b for obtaining an OR (G1+G2) of the images G1 and G2. Light beams having wavelengths of $\lambda_2$ and $\lambda_3$ are used. The color polarizing plate 91 linearly polarizes light beams having a wavelength of $\lambda_2$. The color polarizing plate 93 linearly polarizes light beams having wavelengths of $\lambda_2$ and $\lambda_3$. The color polarizing plate 95 linearly polarizes light beams having a wavelength of $\lambda_3$. In this construction, light beams having a wavelength of $\lambda_2$ are linearly polarized by the color polarizing plate 91, but light beams having a wavelength of $\lambda_3$ are transmitted through the color polarizing plate 91 without such polarization. Among the light beams linearly polarized by the color polarizing plate 91, only the light beams transmitted through the circular transmission region of the LCD device 92 are transmitted through the color polarizing plate 93 based on the above-mentioned principle. Then, the light beams are transmitted through the transmission region of the LCD device 94 without rotation but are rotated by the rotation region of the LCD device 94. However, since all the light beams having a wavelength of $\lambda_2$ are transmitted through the color polarizing plate 95, a circular image is obtained on the display plane 96.

The light beams having a wavelength of $\lambda_3$ are linearly polarized by the color polarizing plate 93 for the first time. Among the light beams linearly polarized by the color polarizing plate 93, only the light beams transmitted through the rectangular transmission region of the LCD device 94 are transmitted through the color polarizing plate 95, whereby a rectangular image is obtained on the display plane 96. As a result, an image made of the circular image G1 and the rectangular image G2 is obtained as the OR operation result on the display plane 96.

FIG. 12c concerns an image operation system 90c for obtaining an inverted image of an EXCLUSIVE-OR (G1 EXOR G2) of the images G1 and G2. A monochromatic light having a wavelength of $\lambda_4$ is used. The color polarizing plates 91 and 95 linearly polarize light beams having a wavelength of $\lambda_4$. The color polarizing plate 93, which transmits such light beams without polarization, may be eliminated or formed of a transparent glass. In this construction, light beams having a wavelength of $\lambda_4$ are linearly polarized by the color polarizing plate 91. The light beams are transmitted through the transmission region of the LCD device 92 without rotation but are rotated at a specified angle by the rotation region of the LCD device 92. Among the light beams rotated by the LCD device 92, the light beams transmitted through the rotation region of the LCD device 94 are further rotated, thereby becoming parallel to the polarizing direction of the color polarizing plate 95. The light beams rotated either by the LCD device 92 or 94 are shielded by the color polarizing plate 95. The light beams transmitted through the transmission region of the LCD device 92 and then the transmission region of the LCD device 94 reach the display plane 96. As a result, an inverted image of the XOR of the images G1 and G2 is obtained as the operation result on the display plane 96.

In the above-mentioned system 90, fundamentally two LCD devices are used for an optical operation. Such a construction requires precise positional alignment of these LCD devices, which is troublesome. Moreover, formation of an image in each LCD device requires data transfer from an image generator. The data transfer takes a long time, which prolongs the processing.

In sequential image processing operations performed by the conventional system 90, light from an object as a reference is received by an imaging device such as a CCD and is converted to an electric signal. Then, such electric signals are sequentially sent to the LCD device 94, and the processed image is displayed therein. An image for operation is displayed on the LCD device 92 by another electric signal, and then a desired light is transmitted through the system for operation. In this case also, photoelectric conversion is necessary in an optical path of either one of the two LCD devices 92 and 94. Therefore, parallel processing cannot be stably performed, which spoils the efficiency of optical processing.

In the system using an LSI as is shown in FIG. 10, complete parallel processing is most desirable, but enlarges the circuit scale. Further, the chip area is enlarged, and the manufacturing cost is significantly high.

SUMMARY OF THE INVENTION

The liquid crystal operation device according to the present invention includes a pair of substrates opposed to each other; a liquid crystal layer interposed between the substrates; a plurality of first electrodes and a plurality of second electrodes which are at least partially opposed to each other with an insulating film interposed therebetween, the first electrodes being provided on one of the substrates; a third electrode provided on a surface of the other substrate to be opposed to the second electrodes; and a photosensitive section bridging the second electrodes and a signal line provided in the vicinity of the second electrodes. The photosensitive section is formed of a photoconductive material. A first capacitance is generated between the first electrodes and the second electrodes; a second capacitance is generated between the second electrodes and the third electrode; and the second electrodes are controllably connected to and separated from the signal line by the photosensitive section.

The image processing system according to the present invention includes a liquid crystal operation device as mentioned above; and a spatial light modulator for optically transferring an image to the liquid crystal operation device.

In the liquid crystal operation device according to the present invention, the following operation is performed as an example.

A voltage is applied between a signal line and a first electrode, and then a light having an image data is emitted from one of the substrates. As a result of this, a charge is accumulated in a capacitance through a photosensitive section in a region exposed to the light. Then, the first electrode and a third electrode are shortcircuited, whereby the charge accumulated in the first capacitance is partially transferred to a second capacitance. Thus, the image data is stored.

Next, another light having another image data is emitted in the same manner. The first electrode and the third electrode are shortcircuited, whereby the charge accumulated in the first capacitance is partially transferred to the second capacitance. Thus, the image data is written on the image data which has previously been written.

This operation is only an example. Various other operations are possible by other types of processing.

Further, by combining the above liquid crystal operation device and a spatial light modulator, sequential processing of image data can be performed.

Thus, the invention described herein makes possible the advantages of providing a liquid crystal operation device and an image processing system using the same in which an entire or a partial image operation is directly conducted with no use of an LSI at a high speed with no necessity of positional alignment.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

Figure 1:
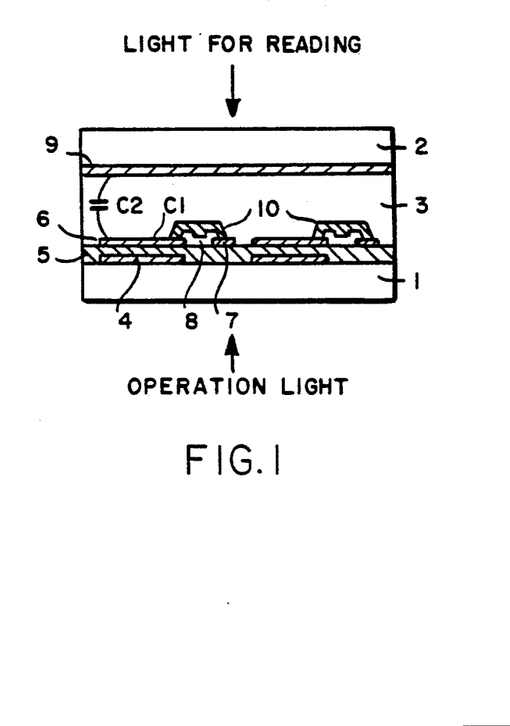
FIG. 1 is a cross sectional view of a liquid crystal operation device according to the present invention.
Figure 2:
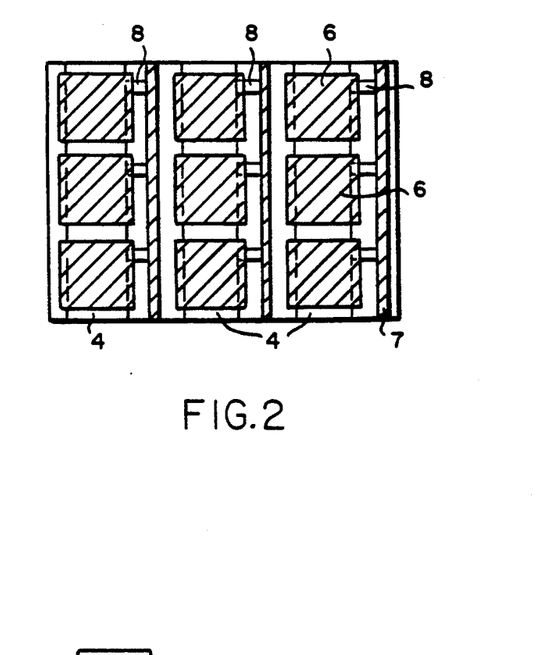
FIG. 2 is a partial plan view of the liquid crystal operation device of FIG. 1.

FIG. 1 illustrates a liquid crystal operation device according to the present invention. The liquid crystal operation device includes a pair of opposed glass substrates 1 and 2 and a liquid crystal 3 enclosed therebetween. On a surface of one of the glass substrates 1 (lower one in FIG. 1). a plurality of lower electrodes 4 formed of Al or the like are provided, and an insulating film 5 is provided on the glass substrate 1 to cover the lower electrodes 4. On the insulating film 5, a plurality of pixel electrodes 6 are provided to be opposed to the lower electrodes 4. As is shown in FIG. 2, the lower electrodes 4 are arranged in stripes in a great number (only three are shown in FIG. 2), and the pixel electrodes 6 are arranged in a matrix in a great number (nine in FIG. 2). An auxiliary capacitance C1 is generated between each pixel electrode 6 and the corresponding lower electrode 4. Source lines 7 as signal lines are disposed between the lower electrodes 4 and extended in parallel with the lower electrodes 4. The pixel electrodes 6 provided on an identical lower electrode 4 are electrically connected to an identical source line 7 each through a photosensitive section 8 formed of a photoconductive material having a resistance changed by light irradiation. The source lines 7 are provided for supplying the pixel electrodes 6 with an image signal. Each photosensitive section 8 is covered with a black mask 10, which is provided for preventing the photosensitive section 8 from being exposed to light for image reading which is emitted, for example, from above. The black mask 10 may be provided on the side of the other glass substrate 2 (upper one in FIG. 1).

On a substantially entire surface of the glass substrate 2, the surface being opposed to the glass substrate 1, a counter electrode 9 is provided. The counter electrode 9 is opposed to all the pixel electrodes 6 with the liquid crystal 3 therebetween. A liquid crystal capacitance C2 is generated between the counter electrode 9 and each pixel electrode 6, utilizing the dielectric characteristic of the liquid crystal 3. The counter electrode 9 can be electrically connected to all the lower electrodes 4 through a specified shortcircuiting device (not shown).

The liquid crystal operation device having the abovementioned construction was produced in the following manner.

First, an Al film was formed in a thickness of 150 nm by use of electron beam evaporation on the lower glass substrate 1 and then etched to obtain the lower electrodes 4 in stripes each having a width of 50 μm. Next, an $Al_2O_3$ film and a $SiN_x$ film were sequentially formed by use of sputtering to obtain the insulating film 5 in a total thickness of 300 nm.

Then, an ITO (indium tin oxide) film was formed by use of sputtering and then etched to obtain the pixel electrodes 6 and the source lines 7. The pixel electrodes 6 are arranged in a matrix of 120 pcs. (longitudinal)×160 pcs. (transverse). Each pixel electrode 6 has a size of 300 μm×300 μm. The arranging pitch of the pixel electrodes 6 is 500 μm, and the gap between the adjacent pixel electrodes 6 is 50 μm.

On the lower glass substrate 1 having such a construction, an a-Si (amorphous silicon) film was formed in a thickness of 200 nm by use of plasma CVD and then etched to obtain the photosensitive sections 8. Then, the black masks 10 were formed of a black pigment to cover the photosensitive sections 8.

On a substantially entire surface of the upper glass substrate 2, ITO was deposited to form the counter electrode 9.

On the glass substrates 1 and 2, $SiO_2$ was deposited in a thickness of 30 nm by use of sputtering, thereafter a polyimide film for horizontal alignment was coated thereon by a spinner, and the resultant surfaces were rubbed so that the liquid crystal 3 to be enclosed would be twisted at 90°.

The glass substrates 1 and 2 were bonded together with plastic beads having a diameter 6 μm therebetween, and then the liquid crystal 3 (for example, ZLI-1565 produced by E. Merck) was enclosed, thereby producing a liquid crystal panel. Then, the liquid crystal panel was interposed between a pair of polarizing plates, thereby producing a liquid crystal operation device. As the liquid crystal 3, a liquid crystal which had been purified to have a resistance of $1\times10^{11}$ Ω·cm or higher was used.

A basic performance of the liquid crystal operation device will be described with reference to an example.

All the source lines 7 and all the lower electrodes 4 are applied with a voltage. In this state, light from an image to be operated (for example, an image A) is emitted from below the liquid crystal operation device. As a result, a desired charge is accumulated in an auxiliary capacitance C1 only through the photosensitive section 8 in a region exposed to the light.

Then, all the lower electrodes 4 and the counter electrode 9 are shortcircuited. This results in that the charge accumulated in the auxiliary capacitance C1 is partially transferred to a liquid crystal capacitance C2 corresponding to the above auxiliary capacitance C1 (referred to as Transfer I, hereinafter). By this, data concerning the image A is stored in the liquid crystal operation device.

Next, all the source lines 7 and all the lower electrodes 4 are applied with a voltage of the same polarity as that of the voltage previously applied. In this state, light from an image to be operated (for example, an image B) is emitted from below the liquid crystal operation device. Then, all the lower electrodes 4 and the counter electrode 9 are shortcircuited. This results in that the charge accumulated in the auxiliary capacitance C1 as mentioned above is partially transferred to the liquid crystal capacitance C2 (referred to as Transfer II, hereinafter), and thus the value of the charge transferred in Transfer II is added to the value of the charge transferred in Transfer I. By this, an operation is performed. Thereafter, light for reading is emitted from above the liquid crystal operation device, thereby reading out the operation result. The surface of the liquid crystal operation device to which the light for operation is emitted and the surface from which the operation result is read out are opposite from each other.

The resistance of the liquid crystal 3 should be sufficiently high to enhance the charge holding capability of the liquid crystal 3 and thus to prevent the charges from being lost in a short period of time, so that two charges can be added. For this purpose, the liquid crystal having the above-mentioned resistance of $1 \times 10^{11}$ Ω·cm was used.

This operation is an example, but other operations can be performed by other processes according to the present invention.

The above-mentioned operation will be described in more detail with reference to AND, OR and XOR operations of a rectangular image extended in a transverse direction and another rectangular image extended in a longitudinal direction.

Before the operations, a rectangular mask extended in the transverse direction and another rectangular mask extended in the longitudinal direction are exposed to parallel light. The light emitted to the former mask is identified as an operation light for the image A, and the light emitted to the latter mask is identified as an operation light for the image B. The operations are performed by sequentially emitting these operation lights from below the liquid crystal operation device, and then emitting light for reading from above. The light for reading is obtained from a light generating device including, for example, a semiconductor laser emitting visible light and a lens.

AND operation

All the source lines 7 and all the lower electrodes 4 are applied with a voltage, and the operation light for the image A ((1) in FIG. 3) is emitted from below the liquid crystal operation device. As a result, a desired charge is accumulated in the auxiliary capacitance C1 only through the photosensitive section 8 in a region exposed to the light. In an equivalent circuit at this point (FIG. 4a), the lower electrode 4 and the pixel electrode 6 generating the auxiliary capacitance C1 have potentials of $-Q$ and $+Q$, respectively.

Figure 4A:
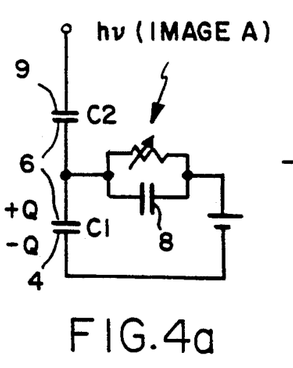
FIGS. 4a through 4e illustrate equivalent circuits of the liquid crystal operation device of FIG. 1 on each step of an AND operation.
Figure 4B:
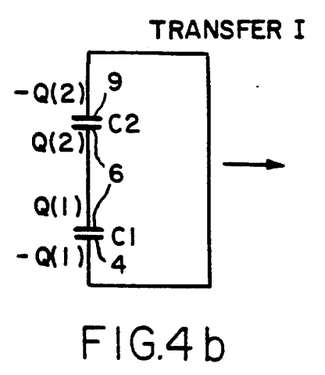

Then, all the lower electrodes 4 and the counter electrode 9 are shortcircuited, whereby the charge accumulated in the auxiliary capacitance C1 is partially transferred to the liquid crystal capacitance C2 (Transfer I) corresponding to the above auxiliary capacitance C1. In an equivalent circuit at this point (FIG. 4b), the potential of the lower electrode 4 is changed from $-Q$ to $-Q(1)$, and the potential of the counter electrode 9 is changed from 0 to $-Q(2)$. The sum of $-Q(1)$ and $-Q(2)$ is $-Q$ (mentioned above). The sum of $Q(1)$ and $Q(2)$ at the pixel electrode 6 is $+Q$ (mentioned above). This means that the data concerning the image A is stored in the liquid crystal operation device.

All the source lines 7 and all the lower electrodes 4 are applied with a voltage of the same polarity as that of the voltage previously applied, and the operation light for the image B ((2) in FIG. 3) is emitted from below the liquid crystal operation device. As a result, a desired charge is accumulated in the auxiliary capacitance C1 only through the photosensitive section 8 in a region exposed to the light. In an equivalent circuit at this point (FIG. 4c), the liquid crystal capacitance C2 does not change, but the potentials of the lower electrode 4 and the pixel electrode 6 generating the auxiliary capacitance C1 are changed to $-Q$ and $+Q$, respectively.

Figure 4C:
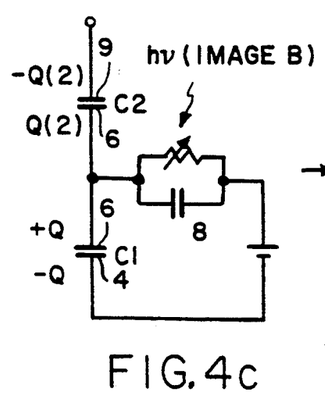
Figure 4D:
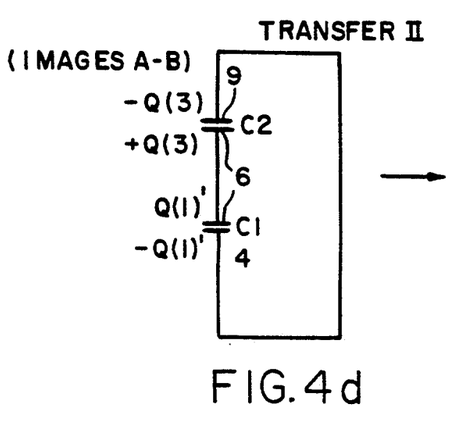

Then, all the lower electrodes 4 and the counter electrode 9 are shortcircuited, whereby the charge accumulated in the auxiliary capacitance C1 is partially transferred to the liquid crystal capacitance C2 (Transfer II). The value of the charge transferred in Transfer II is added to the value of the charge transferred in Transfer I. In an equivalent circuit at this point (FIG. 4d), the potential of the lower electrode 4 is changed from $-Q$ to $-Q(1)'$, and the potential of the counter electrode 9 is changed from $-Q(2)$ to $-Q(3)$. The sum of $-Q(1)'$ and $-Q(3)$ is the sum of $-Q$ and $-Q(2)$ (both mentioned above). The sum of $Q(1)'$ and $+Q(3)$ at the pixel electrode 6 is the sum of $+Q$ and $Q(2)$ (both mentioned above). This indicates that the value of the charge at a portion of the liquid crystal 3 where the charges are added is increased.

Since the liquid crystal 3 has a sufficiently high resistance as mentioned before, the charges are not lost in a short period of time. If the threshold voltage for realignment of liquid crystal molecules is set between the level at Transfer I and the level at Transfer II, the liquid crystal molecules are realigned by the charge transferred in Transfer II only in a portion of the liquid crystal 3 where the images A and B overlap. As a result, that portion is optically modulated to execute an AND operation of the images A and B. The operation result is indicated by hatching in (3) of FIG. 3.

Then, the light for reading is emitted to read out the operation result.

If the threshold voltage for realignment of the liquid crystal molecules is set equal to or higher than the level at Transfer II, only a portion of the liquid crystal 3 where three or more images overlap is optically modulated to execute an AND operation of the three images.

Figure 4E:
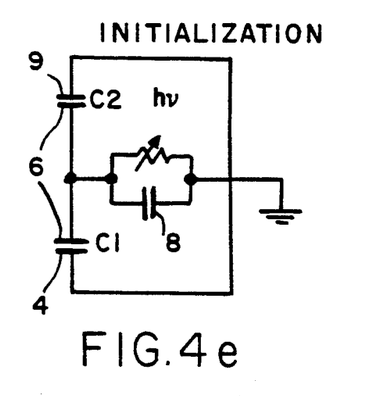

The liquid crystal operation device can be initialized by grounding the source lines 7, the lower electrodes 4 and the counter electrode 9, and then emitting light to the liquid crystal operation device. In an equivalent circuit at this point (FIG. 4e), no charge is accumulated in the auxiliary capacitance C1 or in the liquid crystal capacitance C2. In a subsequent operation, it is desirable to use a voltage having an opposite polarity from that of the voltage previously used, for AC-driving the liquid crystal 3.

OR operation

For an OR operation, the source lines 7 and the counter electrode 9 are applied with a voltage. The lower electrodes 4 and the counter electrode 9 may be shortcircuited to have an identical potential with each other so that the auxiliary capacitance C1 will also be used.

Figure 5A:
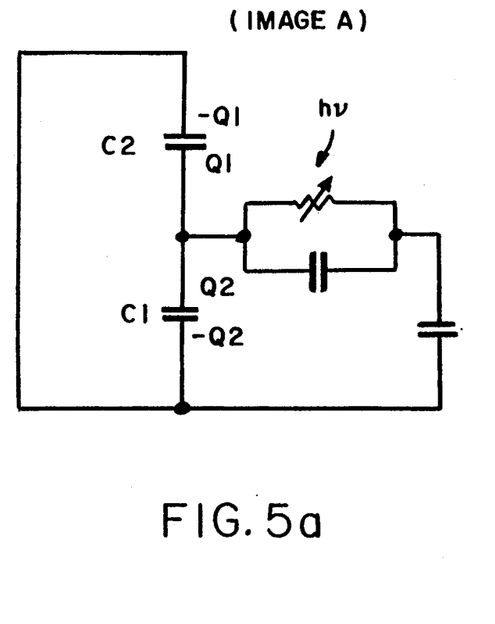
FIGS. 5a and 5b illustrate equivalent circuits of the liquid crystal operation device of FIG. 1 on each step of an OR operation.

A voltage equal to or higher than the threshold voltage for realignment of liquid crystal molecules is applied to the source lines 7 and the counter electrode 9, and the operation light for the image A is emitted from below in this state. As a result, only a portion of the liquid crystal 3 corresponding to the pixel electrode 6 exposed to the light is applied with a high voltage, and thus optically modulated. An equivalent circuit at this point is shown in FIG. 5a. Even after the light is removed, the realignment state of the liquid crystal 3 is stored by the charge holding capability of the liquid crystal 3 or of the auxiliary capacitance C1. In other words, the image A is kept in the liquid crystal 3.

Figure 5B:
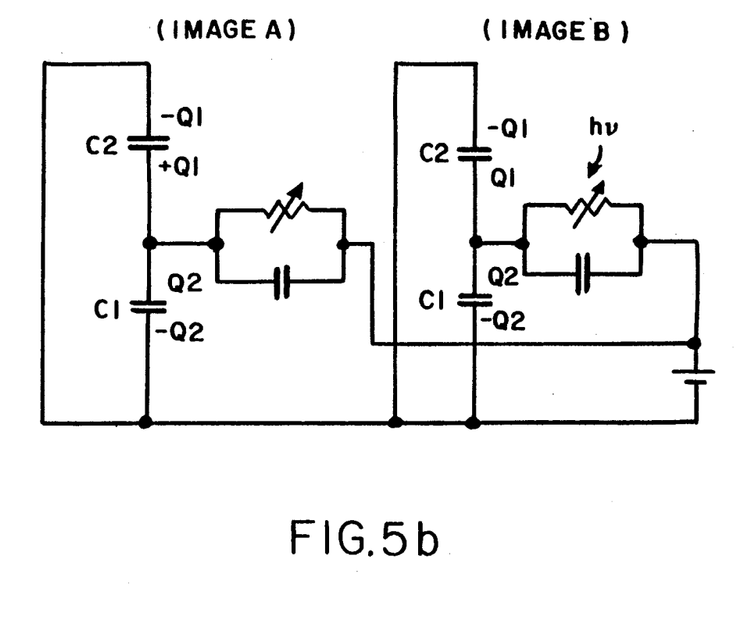

In this state, the operation light for the image B is emitted from below. Then, the image B is formed on the image A in the liquid crystal 3. It means that an OR operation of the images A and B is executed as is shown in (4) of FIG. 3. An equivalent circuit at this point is shown in FIG. 5b.

An OR image operation can be executed throughout the charge holding time. For writing the image B, it is acceptable to use a voltage having an opposite polarity from the voltage used for the image A as long as the voltage is sufficiently high to drive the liquid crystal 3. The method for initialization and the effect of the voltage polarity on a subsequent operation are identical with those in the case of the AND operation.

XOR Operation

For an XOR operation, voltage polarity is effectively utilized. The source lines 7 and the counter electrode 9 are applied with a voltage. The lower electrodes 4 and the counter electrode 9 may be shortcircuited to have an identical potential with each other so that the auxiliary capacitance C1 will also be used.

Figure 6A:
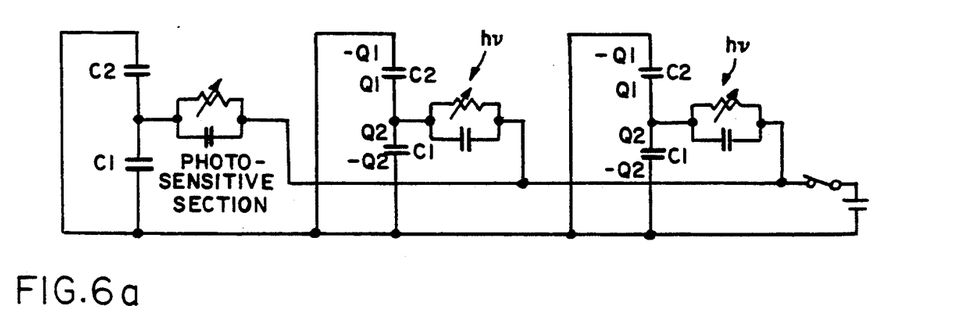
FIGS. 6a through 6c illustrate equivalent circuits of the liquid crystal operation device of FIG. 1 on each step of an XOR operation.

A voltage equal to or higher than the threshold voltage for realignment of the liquid crystal molecules is applied to the source lines 7 and the counter electrode 9, and the operation light for the image A is emitted from below in this state. As a result, only a portion of the liquid crystal 3 corresponding to the pixel electrode 6 exposed to the light is applied with a high voltage, and thus optically modulated. An equivalent circuit at this point is shown in FIG. 6a. Even after the light is removed, the realignment state of the liquid crystal 3 is stored by the charge holding capability of the liquid crystal 3 or of the auxiliary capacitance C1.

Figure 6B:
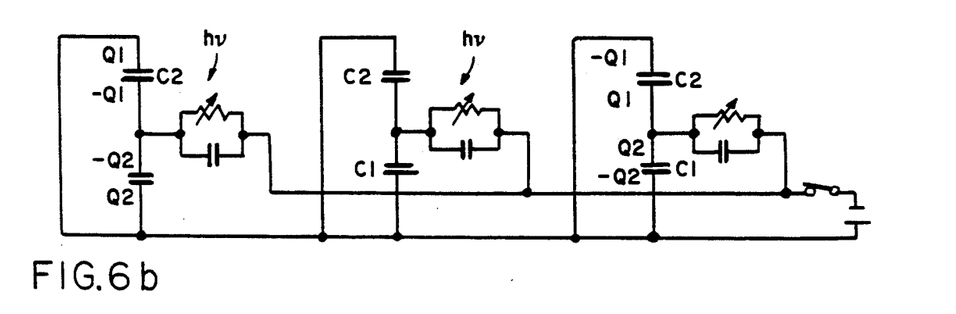
Figure 6C:
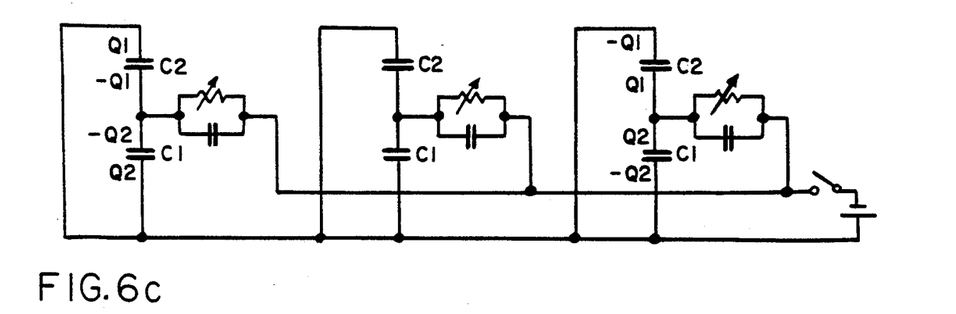

Then, the source lines 7 and the counter electrode 9 are applied with a voltage having an opposite polarity from the voltage previously applied, and the operation light for the image B is emitted from below. An equivalent circuit at this point is shown in FIG. 6b. By the emission of the operation light for the image B, the charge accumulated by the operation light for the image A is discharged down to a value equal to or lower than that of the threshold voltage for realignment of the liquid crystal molecules. Therefore, a portion of the liquid crystal 3 corresponding to the pixel electrode 6 exposed both to the operation light for the image A and the operation light for the image B, namely, to the pixel electrode 6 where the charge is discharged is initialized. Another portion of the liquid crystal 3 corresponding to the pixel electrode 6 exposed only to the operation light for the image B is applied with a voltage which has an opposite polarity from the voltage previously applied but has a value equal to or higher than that of the threshold voltage for realignment of the liquid crystal molecules, and thus is optically modulated. Still another portion of the liquid crystal 3 corresponding to the pixel electrode 6 exposed to the operation light for the image A but not to the operation light for the image B keeps the realignment state by the aforementioned charge holding capability. An equivalent circuit at this point is shown in FIG. 6c.

Figure 3:
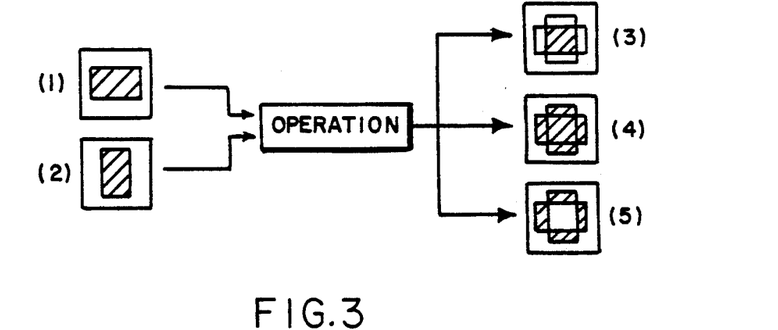
FIG. 3 is a view illustrating operations executed by the liquid crystal operation device of FIG. 1.

In this way, an XOR operation result shown in (5) of FIG. 3 is formed. The method for initialization and the effect of the voltage polarity on a subsequent operation are identical with those in the case of the AND operation.

In the liquid crystal operation device according to this example, the AND, OR and XOR operations can be executed in one operation device with no necessity of any positional alignment which is conventionally required.

Various modifications of this example will be described.

As a material of the photosensitive section 8, other materials than a-Si can be used. Usable materials include amorphous silicons such as a-SiC and a-SiN, inorganic materials including amorphous chalcogenide such as a-Se, a-Se.Te, a-Se.As and a-As$_2$Se$_3$, inorganic crystals such as ZnO, CdS and BSO(Bi$_{12}$SiO$_{20}$)BGO(Bi$_{12}$GeO$_{20}$), and organic photoconductive materials such as polyvinyl carbazole and a bisazo pigment.

The insulating film 5 may have a one-layer structure or a three-layer structure instead of a two-layer structure. As a material of the insulating film 5, an inorganic material such as SiO$_2$ or Ta$_2$O$_5$, or an organic material such as polyimide, polyvinyl alcohol or polyamide may be used instead of Al$_2$O$_3$ and SiN$_x$.

The pixel electrodes 6 and the counter electrode 9 may be formed of SnO$_2$ or the like instead of ITO.

The source lines 7 and the lower electrodes 4 may be formed of Al, Cr, Ta, Mo, Ti or other metal materials instead of ITO.

The black masks 10 may be formed of an organic material containing a black pigment or a black dye or a color inorganic material instead of a black pigment. In the case when the black masks 10 are formed at positions which are not influenced by the shortcircuit between the lower electrodes 4 and the counter electrode 9, for example, on a surface of the counter electrode 9, the black masks 10 may be formed of a metal.

As the liquid crystal 3, a nematic, smectic, or chiral nematic liquid crystal may be used. As a display mode, a TN, STN, phase transition, ECB, guesthost, or ferroelectric mode may be used. It is desirable to use a liquid crystal having a high resistance for enhancing the charge holding capability.

Figure 7A:
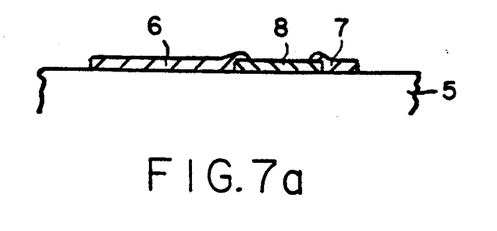
FIGS. 7a through 7d illustrate modifications of the liquid crystal operation device of FIG. 1.

The construction in the vicinity of the photosensitive section 8 is not limited to the one shown in FIG. 1, but may be as shown in FIGS. 7a, 7b, 7c or 7d. In FIG. 7a, an end portion of the pixel electrode 6 and a side peripheral portion of the source line 7 are disposed on the photosensitive section 8.

Figure 7B:
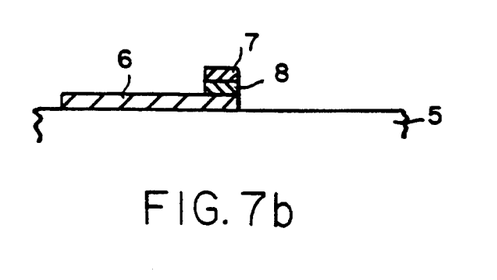

In FIG. 7b, the photosensitive section 8 and the source line 7 are sequentially laminated on the pixel electrode 6.

Figure 7C:
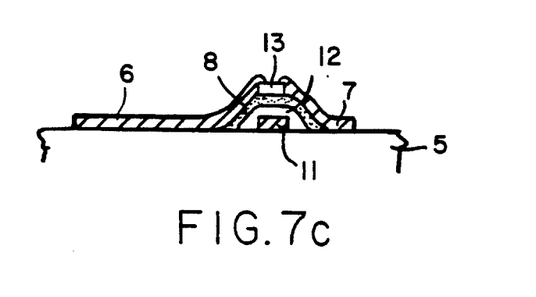

In FIG. 7c, a lamination having the photosensitive section 8 and a gate line 11 as a scanning line with a gate insulating film 12 interposed therebetween is inserted from between an end portion of the pixel electrode 6 and the insulating film 5 to between a side peripheral portion of the source line 7 and the insulating film 5. Further, another insulating film as an etching stop layer 13 is inserted from between the photosensitive section 8 and the end portion of the pixel electrode 6 to between the photosensitive section 8 and the side peripheral portion of the source line 7. In other words, this is the construction of a reverse stagger TFT.

Figure 7D:
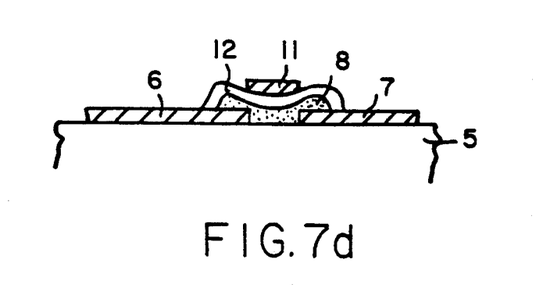

In FIG. 7d, an end portion of the pixel electrode 6 and a side peripheral portion of the source line 7 which are separated from each other are covered with the photosensitive section 8, the gate insulating film 12 and the gate line 11 acting as a gate electrode. The photosensitive section 8, the gate insulating film 12 and the gate line 11 are sequentially laminated.

The source line 7 in FIG. 7b and the gate line 11 in FIGS. 7c and 7d may be formed of a metal, in which case, the source line 7 and the gate line 11 each act as a light shielding member in addition to being a conductive member. Usable metals include Al, Cr, Ta, Mo and Ti.

Among the various modifications of the liquid crystal operation device, the device shown in FIG. 7c were produced in the following manner.

A Cr film was formed on a glass substrate (not shown) in a thickness of 150 nm by use of sputtering and then etched to obtain lower electrodes (not shown) each having a width of 50 μm. On the glass substrate having the lower electrodes, an $SiN_x$ film was formed in a thickness of 200 nm by use of plasma CVD to obtain the insulating film 5. Then, a Ta film was formed in a thickness of 150 nm by use of sputtering, and then etched to obtain the gate line 11. An upper surface of the gate line 11 was anodized into a $Ta_2O_5$ layer. Then, an $SiN_x$ layer (referred to as the lower $SiN_x$ layer), an a-Si layer and another $SiN_x$ layer (referred to as the upper $SiN_x$ layer) were sequentially laminated by use of plasma CVD. A total thickness of the $Ta_2O_5$ layer and the lower $SiN_x$ layer is approximately 150 nm. The a-Si layer has a thickness of approximately 250 nm, and the upper $SiN_x$ layer has a thickness of approximately 100 nm.

The upper $SiN_x$ layer and the a-Si layer were treated with dry etching to be the etching stop layer 13 and the photosensitive section 8 (semiconductor layer), respectively.

An a-Si(n+) film was formed in a thickness of 30 nm by use of plasma CVD, and then an ITO film was formed in a thickness of 150 nm by use of sputtering. These layers were etched to obtain a contact layer (not shown) of a-Si(n+), the source line 7 acting as a source electrode and the pixel electrode 6 both of ITO.

Although not shown, an ITO film was formed on an entire surface of another glass substrate to obtain a counter electrode.

Since the gate line 11 also acts as a black mask, the light for operation is emitted from the side of the etching stop layer 13 and the light for reading is emitted from the side of the gate line 11.

After the formation of the above lamination and the counter electrode, the same process as in the preceding example was used to produce a liquid crystal operation device. The usable types of liquid crystal, the arranging pitch and the number of the pixel electrodes, and the like are the same as in the preceding example.

The capability of operation of the liquid crystal operation device produced in this manner was tested as follows.

The gate line 11 was floated, and an operation of diagrams was executed in the same way as in the preceding example, to confirm the liquid crystal operation device was capable of AND, OR and XOR operations.

Then, a signal indicating a circle was inputted to the pixel electrode 6 from the source line 7 using the gate line 11. The gate line 11 was floated again, and an optical signal indicating a rectangle or the like was inputted. The value and the polarity of the voltage applied between the source line 7 and the counter electrode, and between the source line 7 and the lower electrode were changed based on the above-mentioned operation principle, to confirm that the AND, OR and XOR operations were executed.

In FIGS. 1 and 7a through 7d, another film may be inserted between the pixel electrode 6 and the photosensitive section 8 in order to improve the electric contact therebetween.

The lower electrode 4 need not have the same width as that of the pixel electrode 6 as is in FIG. 1. The lower electrode 4, when being exposed to light a plurality of times, supplies charges for driving the liquid crystal 3. Accordingly, the width of the lower electrode 4 is determined in accordance with an area thereof, which is based on the threshold voltage, capacity and resistance of the liquid crystal 3, dielectric constant and thickness of the insulating film, and the like.

In the liquid crystal operation devices having the TFT structures shown in FIGS. 7c and 7d, a source signal running through the source line 7 can be sent to the pixel electrode 6 by a gate signal running through the gate line 11. Accordingly, an operation can be executed based on the above-mentioned principle by electrically forming an image A by a known TFT driving method and then optically writing an image B on the image A. In other words, an operation of a fixed pattern and a variable pattern can be executed. For example, in a mask inspection or an inspection of component mounting, an original image is inputted as a fixed pattern to the liquid crystal operation device by a TFT driving method, and then an image for inspection carried on an inspection line is optically inputted as a variable pattern to the liquid crystal operation device. The voltage applying conditions such as the value, polarity and length of time are adjusted to match a desired operation based on the above-mentioned principle. Thus, defects can be detected in a short period of time by an XOR operation. In order to enhance the sensitivity of the photoconductive material used for the photosensitive section 8, the parameters which determine the photoconductive characteristics of the semiconductor material used in the liquid crystal operation device should be much better than those of a semiconductor material used in a usual LCD device having a TFT structure. For example, an a-Si layer should have a thickness of 50 nm or more.

Figure 8:
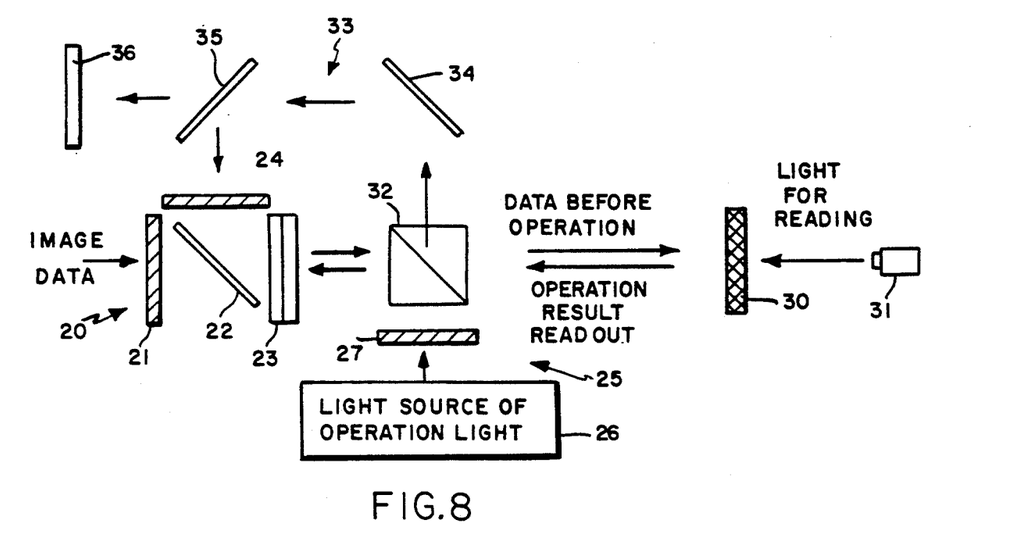
FIG. 8 is a schematic view of an image processing system according to the present invention.

FIG. 8 illustrates an image processing system according to the present invention, to which the liquid crystal operation device is applied.

The image processing system includes a liquid crystal operation device 30, a laser source 31 for emitting a laser beam for reading an image displayed in the liquid crystal operation device 30, a beam splitter 32 for supplying the liquid crystal operation device 30 with two types of light given from two directions, an operation light emitter 25 provided under the beam splitter 32 for emitting one of the types of light, namely, operation light, an image light emitter 20 provided to the left (in FIG. 8) of the beam splitter 32 for emitting the other type of light, namely, image light, and a monitor 33 for transferring the image based on light emitted from an upper side of the beam splitter 32.

The operation light emitter 25 includes a light source 26 for emitting the operation light and a liquid crystal shutter 27 for transmitting or shielding the light emitted by the light source 26. The light emitted by the light source 26 is sent to the liquid crystal operation device 30 through the beam splitter 32 at a specified timing.

The monitor 33 includes a mirror 34 for reflecting the light emitted from the upper side of the beam splitter 32, a half mirror 35 for receiving the light reflected by the mirror 34, and a screen 36 for receiving the light transmitted through the half mirror 35. In this construction, an image monitored is displayed on the screen 36. The light reflected by the half mirror 35 is sent to another liquid crystal shutter 24 (described later).

The image light emitter 20 includes still another liquid crystal shutter 21, a spatial light modulator (referred to as SLM, hereinafter) 23 for receiving an image data through the liquid crystal shutter 21, another half mirror 22 provided between the SLM 23 and the liquid crystal shutter 21, and the liquid crystal shutter 24 provided above the half mirror 22.

Figure 9:
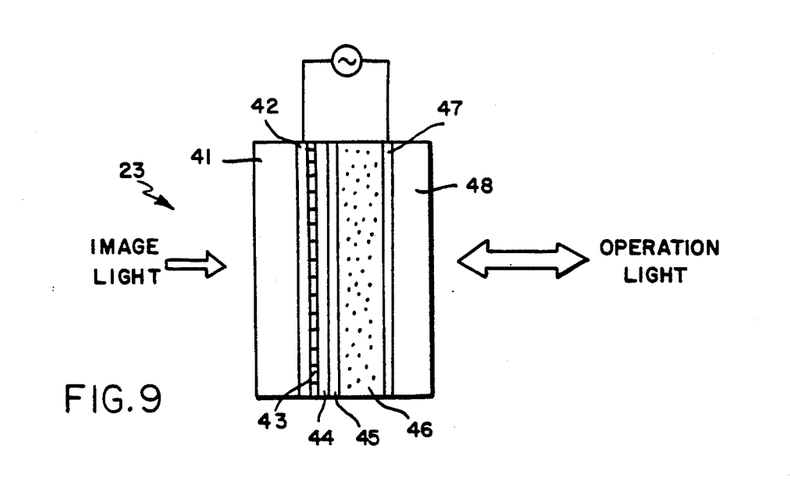
FIG. 9 is a cross sectional view of a spatial light modulator used in the image processing system of FIG. 8.

As is shown in FIG. 9, the SLM 23 includes a pair of glass substrates 41 and 48, a transparent electrode 42, a photoconductive layer 43, a light shielding layer 44, a light reflecting layer 45, a liquid crystal layer 46, and another transparent electrode 47. The above electrodes and layers are formed in the above-mentioned order from the side of the glass substrate 41.

A voltage is applied to the liquid crystal layer 46 through the photoconductive layer 43, the light shielding layer 44, and the light reflecting layer 45. Then, image light, namely, light from a fixed image as a fixed image data is emitted from the side of the glass substrate 41. Since the resistance of a portion of the photoconductive layer 43 exposed to the image light is lowered, a high voltage is applied to a portion of the liquid crystal layer 46 corresponding to the above portion of the photoconductive layer 43, whereby the alignment of the liquid crystal molecules in the above portion are changed. Operation light from the light source 26 is incident on the side of the glass substrate 48 through the beam splitter 32. The operation light is reflected by the light reflecting layer 45 but is modulated at the portion of the liquid crystal layer 46 where the alignment is changed. As a result, the image light which is incident on the side of the glass substrate 41 can be taken out as reflected image light by the operation light incident from the side of the glass substrate 48. The reflected image light can be used as an image data for an operation. In the image processing system, operations are practically executed in the following manner.

A data concerning a fixed image A in the form of light is inputted to the SLM 23 through the liquid crystal shutter 21, whereby the SLM 23 forms a reflected image of the image data as mentioned above. Operation light is emitted to the beam splitter 32 through the liquid crystal shutter 27 for a desired period of time and is projected on the SLM 23 having the reflected image, and then is written into the liquid crystal operation device 30 through the beam splitter 32.

A data of an image B for operation is written into the liquid crystal operation device 30 in the same manner. In this way, an operation is executed.

Then, light for reading from the laser source 31 is emitted to the liquid crystal operation device 30. The image data displayed in the liquid crystal operation device 30 as the operation result is displayed on the screen 36 through the beam splitter 32, the mirror 34 and the half mirror 35, and also is transferred to the incident side of the SLM 23.

Accordingly, in this image processing system, the operation result is confirmed based on the image displayed on the screen 36. By sending a new data concerning a new image to the SLM 23 through the liquid crystal shutter 21, a subsequent operation is executed based on the new data and the preceding image data which has been transferred to the incident side of the SLM 23.

For the liquid crystal shutters 21, 24 and 27, a surface stabilized ferroelectric liquid crystal (SSF-LC) using CS-14 (described in detail later) were used. Instead of the liquid crystal shutters, other types of shutters may be used. It is desirable to use high speed shutters in order to execute high speed operations.

For the monitor 33, an optical processing system such as a CCD or an image processing LSI is used for electrically processing image data. Other optical systems may be used.

In the case when the liquid crystal operation device having a TFT structure shown in FIG. 7c or 7d is used in the image processing system shown in FIG. 8, a construction is applicable in which an image data obtained by a gate signal is transferred to and displayed in the liquid crystal operation device, and an operation is executed based on the obtained image data and another image data obtained by the SLM 23.

The image processing system according to the present invention is not limited to the one shown in FIG. 8, but may have any construction including the liquid crystal operation device and an SLM as long as an operation is executed based on an image data obtained by the liquid crystal operation device and sent to the SLM and another image data inputted to the liquid crystal operation device from another system.

The SLM 23 was produced in the following manner. The transparent electrodes 42 and 47 were formed by depositing ITO in a thickness of 150 nm each by use of sputtering. The photoconductive layer 43 was formed by depositing a-Si in a thickness of approximately 1 $\mu$m by use of plasma CVD. The light shielding layer 44 was formed by coating the photoconductive layer 43 with polyimide containing a black pigment by a spinner and then heating the polyimide. The light reflecting layer 45 was formed by laminating $TiO_2$ films and $SiO_2$ films in a total approximate number of 20. The liquid crystal layer 46 was formed of, for example, CS-14, which is a ferroelectric liquid crystal produced by Chisso Petrochemical Corp. The liquid crystal layer 46 has a thickness of approximately 2 $\mu$m. The liquid crystal molecules were aligned by an alignment film formed of nylon.

Since the liquid crystal used in the SLM 23 is ferroelectric (bistable mode), the image inputted to the SLM 23 can be converted into a binary code. By changing the polarity of an initializing voltage pulse after light is incident on an entire surface of the incident side, a positive or a negative image of the inputted image can be obtained. By increasing the voltage when the image is inputted, thus to blur the image, the inputted image can be enlarged. The photosensitivity of the SLM 23 is 80 $\mu W/cm^2$, and the applied voltage is ±30 V at the maximum.

In the case when the display mode of the liquid crystal layer 46 of the SLM 23 has a memory function as in the phase transition mode, the ferroelectric mode (display mode using the ferroelectric liquid crystal) and the like, a memory image of the inputted image can be obtained. In the case when the display mode requires a polarizing plate as in the TN mode, HFE mode (TN mode having a twist angle of approximately 45°), a negative image or a positive image can easily be formed only by rotating the polarizing plate by 90°. Especially when the ferroelectric mode is used, a negative image or a positive image can be obtained only by reversing the polarity of the applied voltage. Moreover, an enlarged image or a reduced image can be obtained by changing the value of the voltage or the frequency.

In the case when a display mode which shows stability in only two states such as the ferroelectric mode or a display mode which has a steep threshold characteristic such as the STN mode or the phase transition mode is used, a binary image of the inputted image is obtained.

Needless to say, by moving, rotating, reducing or enlarging the inputted image, a reflected image corresponding to such processing is obtained.

As has been described so far, the SLM 23 enables processing of an image to obtain an enlarged, reduced, rotated, moved, negative/positive-converted or binary image.

The image processing system according to the present invention may include a combination of the liquid crystal operation device shown in FIG. 1 and the one shown in FIG. 7c or 7d. Since a plurality of different image data can be processed by the liquid crystal operation device having a TFT structure as described above, three images can be subjected to AND, OR and XOR operations, outline extraction (XOR of an image and an enlarged image thereof) and enlargement.

Consequently, in the image processing system according to the present invention, image outline extraction, image comparison (XOR or AND of an image and another image), image enlargement (OR of an image and an enlarged image thereof), formation of a binary image (by use of an SLM), and other general image processing can be performed at a high speed. Therefore, the image processing system is applicable to a wide range of industrial and consumer uses including various inspections using images (process inspection, mask inspection, etc.), acceleration sensors (used for preventing vibration while being handled by a hand, and for controlling standing tilt of vehicles, etc.), extraction of moving objects, voice recognition, fingerprint collation, and character recognition.

According to the present invention, an operation is executed by emitting two or more types of operation light to at least one liquid crystal operation device at different times. Therefore, positional alignment is not necessary. Moreover, since the operation is executed by two or more light emissions, high speed processing effective for dealing with a large amount of data is realized.

In the case when the liquid crystal operation device and an SLM are combined, a large amount of data can be processed at a higher speed than a conventional system using an LSI. This is applicable to a wide range of uses such as factory automation equipment using general image processing including various inspection pattern collations, medical equipment for abnormal cell detection, etc., acceleration sensors, and consumer products using voice recognition and character recognition. In the future, this system is expected to be used for neurocomputers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal operation device, comprising:
   a pair of substrates opposed to each other;
   a liquid crystal layer interposed between the substrates;
   a plurality of first electrodes and a plurality of second electrodes which are at least partially opposed to each other with an insulating film interposed therebetween, the first electrodes being provided on one of the substrates;
   a third electrode provided on a surface of the other substrate to be opposed to the second electrodes; and
   a photosensitive section bridging the second electrodes and a signal line provided in the vicinity of the second electrodes, the photosensitive section being formed of a photoconductive material,
   wherein a first capacitance is generated between the first electrodes and the second electrodes, a second capacitance is generated between the second electrodes and the third electrode, and the second electrodes are controllably connected to and separated from the signal line by the photosensitive section.

2. A liquid crystal operation device according to claim 1, wherein the second electrodes and the signal line are separated from each other and arranged in a direction along the surface of one of the substrates, and a portion of the photosensitive section is connected to the second electrode and another portion thereof is connected to the signal line.

3. A liquid crystal operation device according to claim 2, further comprising a scanning line opposed to the signal line with the photosensitive section interposed therebetween, the scanning line being electrically insulated from the second electrodes, the signal line and the photosensitive section.

4. A liquid crystal operation device according to claim 1, wherein the signal line is provided on a portion of the second electrodes with the photosensitive section interposed therebetween.

5. An image processing system, comprising:
   a liquid crystal operation device; and
   a spatial light modulator for optically transferring an image to the liquid crystal operation device,
   wherein the liquid crystal operation device comprises:
   a pair of substrates opposed to each other;
   a liquid crystal layer interposed between the substrates;
   a plurality of first electrodes and a plurality of second electrodes which are at least partially opposed to each other with an insulating film interposed therebetween, the first electrodes being provided on one of the substrates;

a third electrode provided on a surface of the other substrate to be opposed to the second electrodes; and a photosensitive section bridging the second electrodes and a signal line provided in the vicinity of the second electrodes, the photosensitive section being formed of a photoconductive material, wherein a first capacitance is generated between the first electrodes and the second electrodes, a second capacitance is generated between the second electrodes and the third electrode, and the second electrodes are controllably connected to and separated from the signal line by the photosensitive section.

6. An image processing system according to claim 5, wherein the spatial light modulator comprises a transparent electrode, a photoconductive layer, a light reflecting layer, a liquid crystal layer and another transparent electrode which are laminated between the substrates in this order.

7. An image processing system according to claim 5, wherein the second electrodes and the signal line are separated from each other and arranged in a direction along the surface of one of the substrates, and a portion of the photosensitive section is connected to the second electrode and another portion thereof is connected to the signal line.

8. An image processing system according to claim 5, further comprising a scanning line opposed to the signal line with the photosensitive section interposed therebetween, the scanning line being electrically insulated from the second electrodes, the signal line and the photosensitive section.

9. An image processing system according to claim 5, wherein the signal line is provided on a portion of the second electrodes with the photosensitive section interposed therebetween.

10. An image processing system according to claim 5, further comprising another liquid crystal operation device which comprises:

a pair of substrates opposed to each other;

a liquid crystal layer interposed between the substrates;

a plurality of fourth electrodes and a plurality of fifth electrodes which are at least partially opposed to each other with an insulating film interposed therebetween, the fourth electrodes being provided on one of the substrates;

a sixth electrode provided on a surface of the other substrate to be opposed to the fifth electrodes; and a photosensitive section bridging the fifth electrodes and a signal line provided in the vicinity of the fifth electrodes, the photosensitive section being formed of a photoconductive material, wherein a third capacitance is generated between the fourth electrodes and the fifth electrodes, a fourth capacitance is generated between the fifth electrodes and the sixth electrode, and the fifth electrodes are controllably connected to and separated from the signal line by the photosensitive section.

* * * * *